(12) United States Patent
Weed et al.

(10) Patent No.: US 11,029,441 B2
(45) Date of Patent: Jun. 8, 2021

(54) SCANNING SYSTEMS WITH DYNAMICALLY ADJUSTABLE SHIELDING SYSTEMS AND RELATED METHODS

(71) Applicant: Analogic Corporation, Peabody, MA (US)

(72) Inventors: Steven Weed, Marblehead, MA (US); Patrick Splinter, Middleton, MA (US)

(73) Assignee: Analogic Corporation, Peabody, MA (US)

( * ) Notice: Subject to any disclaimer, the term of this patent is extended or adjusted under 35 U.S.C. 154(b) by 45 days.

(21) Appl. No.: 16/422,709

(22) Filed: May 24, 2019

(65) Prior Publication Data

US 2020/0371267 A1 Nov. 26, 2020

(51) Int. Cl.
*G01N 23/04* (2018.01)
*G01V 5/00* (2006.01)

(52) U.S. Cl.
CPC ......... *G01V 5/0066* (2013.01); *G01N 23/04* (2013.01); *G01N 2223/3303* (2013.01)

(58) Field of Classification Search
CPC ........ G01N 23/00; G01N 23/02; G01N 23/04; G01N 23/06; G01N 23/083; G01N 23/10; G01N 23/18

USPC ....................... 378/57, 62, 69, 116, 146, 204
See application file for complete search history.

(56) References Cited

U.S. PATENT DOCUMENTS

| | | | |
|---|---|---|---|
| 6,430,255 B2 * | 8/2002 | Fenkart | G01N 23/046 378/203 |
| 7,561,664 B2 * | 7/2009 | Teslyar | B64F 1/368 378/57 |
| 9,728,290 B2 | 8/2017 | Weed | |

* cited by examiner

*Primary Examiner* — Jurie Yun
(74) *Attorney, Agent, or Firm* — TraskBritt

(57) ABSTRACT

Scanning systems may include a stator, a rotor supporting at least one radiation source and at least one radiation detector rotatable with the rotor, and a motivator operatively connected to the rotor. The stator, the rotor, the at least one radiation source, and the at least one radiation detector may be located within a housing. A conveyor system may extend through the housing and the rotor. A shielding system including a series of independently movable energy shields sized, shaped, and positioned to at least partially occlude a pathway along which the conveyor system extends may extend from an entrance to the housing, through the rotor, to an exit from the housing. A control system may be configured to cause the shielding system to automatically and dynamically move individual energy shields in response to advancement of one or more objects supported on the conveyor system.

21 Claims, 8 Drawing Sheets

SCANNING SYSTEMS WITH DYNAMICALLY ADJUSTABLE SHIELDING SYSTEMS AND RELATED METHODS

FIELD

This disclosure relates generally to scanning systems configured to convey articles through the scanning systems, expose those articles to radiation to scan the articles (e.g., by performing computed tomography scanning), and be located in an environment where there is the potential to expose people to radiation scatter, and methods of operating such scanning systems. More specifically, disclosed embodiments relate to scanning systems configured to inspect conveyed objects using radiation scanning techniques that may reduce risk of radiation exposure, reduce risk of jamming the scanning system or otherwise slowing down the process of scanning items, and reduce risk of losing items during the scanning process.

BACKGROUND

When performing radiation-based (e.g., computed tomography (CT)) scanning of objects, shielding may be provided to reduce the risk that people and animals in the vicinity of the scanning system will be exposed to radiation produced during scanning. For example, fixed plates of shielding may be provided in the housing of scanning systems at least around the examination region, the radiation source(s), and the radiation detector(s). Flaps including shielding material (e.g., lead) may also be positioned along the pathway through the scanning system.

BRIEF SUMMARY

In some embodiments, scanning systems configured to perform radiation-based scanning may include a stator, a rotor supporting at least one radiation source and at least one radiation detector rotatable with the rotor, and a motivator operatively connected to the rotor to rotate the rotor relative to the stator. The stator, the rotor, the at least one radiation source, and the at least one radiation detector may be located within a housing. A conveyor system may extend through the housing and the rotor. A shielding system including a series of independently movable energy shields sized, shaped, and positioned to at least partially occlude a pathway along which the conveyor system extends may extend from an entrance to the housing, through the rotor, to an exit from the housing. A control system may be operatively connected to the stator, the rotor, the radiation source, the conveyor system, and the shielding system. The control system may be configured to cause the shielding system to automatically and dynamically move individual energy shields in response to advancement of one or more objects supported on the conveyor system.

In other embodiments, methods of operating scanning systems configured to perform radiation-based scanning may involve advancing an object supported on a conveyor system under control of a control system toward an entrance to a pathway extending through a housing, the housing enclosing a stator and a rotor supporting at least one radiation source and at least one radiation detector rotatable with the rotor, the pathway passing between the at least one radiation source and the at least one radiation detector. At least one energy shield at least partially occluding the entrance may be automatically moved to an at least partially open state under control of the control system in response to advancement of the object toward the entrance. The at least one energy shield may be automatically moved to a closed state under control of the control system in response to the object passing the at least one energy shield

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

The illustrations presented in this disclosure are not meant to be actual views of any particular scanning system for performing radiation-based (e.g., computed tomography (CT)) scanning or component thereof or component thereof, but are merely idealized representations employed to describe illustrative embodiments. Thus, the drawings are not necessarily to scale.

Disclosed embodiments relate generally to scanning systems configured to inspect conveyed objects using radiation-based scanning that may reduce risk of radiation exposure, reduce risk of jamming the scanning system or otherwise slowing down the process of scanning items, and reduce risk of losing items during the scanning process. More specifically, disclosed are embodiments of scanning systems configured to inspect conveyed objects using radiation-based scanning that may actively move energy shields and shade curtains in the pathway through the scanning systems at least partially out of the way of objects to be scanned.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

As used herein, spatially relative terms, such as "upper," "lower," "bottom," and "top," are for ease of description in identifying one element's relationship to another element, as illustrated in the figures. Unless otherwise specified, the spatially relative terms are intended to encompass different orientations of the materials in addition to the orientation depicted in the figures. Thus, the term "upper" can encompass elements above, below, to the left of, or to the right of other elements, depending on the orientation of a device. The materials may be otherwise oriented (rotated ninety degrees, inverted, etc.) and the spatially relative descriptors used herein interpreted accordingly.

Figure 1:
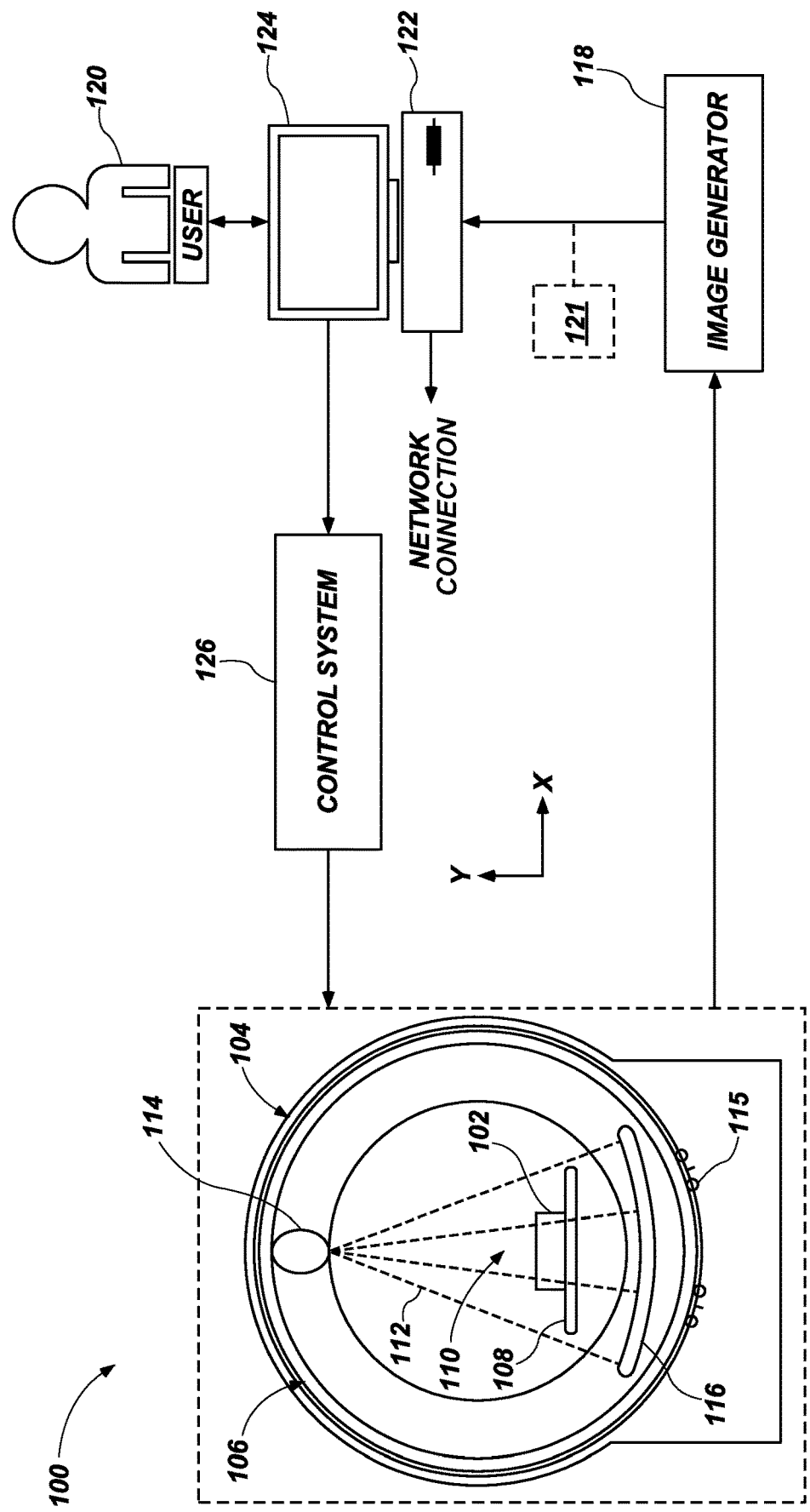
FIG. 1 is a schematic of a scanning system configured to perform radiation-based scanning.

FIG. 1 is a schematic of a scanning system 100 configured to perform radiation-based (e.g., CT) scanning. Techniques in accordance with this disclosure may find applicability with, for example, CT systems, line-scan systems, digital projection systems, diffraction systems, and/or other systems comprising a radiation detector system. The scanning system 100 may be configured to examine one or more objects 102 (e.g., a series of suitcases at an airport, freight, parcels, etc.). The scanning system 100 may include, for example, a stator 104 and a rotor 106 rotatable relative to the stator 104. During examination, the object(s) 102 may be located on a support 108, such as, for example, a bed, roller conveyor, or conveyor belt, that is selectively positioned in an examination region 110 (e.g., a hollow bore in the rotor 106 in which the object(s) 102 is exposed to radiation 112), and the rotor 106 may be rotated about the object(s) 102 by a motivator 115 (e.g., motor, drive shaft, chain, etc.).

The rotor 106 may surround a portion of the examination region 110 and may be configured as, for example, a gantry supporting at least one radiation source 114 (e.g., an ionizing x-ray source, gamma-ray source, etc.) oriented to emit radiation toward the examination region 110 and at least one radiation detector 116 supported on a substantially diametrically opposite side of the rotor 106 relative to the radiation source(s) 114. During an examination of the object(s) 102, the radiation source(s) 114 emits fan and/or cone shaped radiation 112 configurations into the examination region 110. The radiation 112 can be emitted, for example at least substantially continuously or intermittently (e.g., a pulse of radiation 112 followed by a resting period during which the radiation source(s) 114 is not activated).

As the emitted radiation 112 traverses the object(s) 102, the radiation 112 may be attenuated differently by different aspects of the object(s) 102. Because different aspects attenuate different percentages of the radiation 112, an image or images can be generated based upon the attenuation, or variations in the number of radiation photons that are detected by the radiation detector 116. For example, more dense aspects of the object(s) 102, such as an inorganic material, may attenuate more of the radiation 112 (e.g., causing fewer photons to be detected by the radiation detector 116) than less dense aspects, such as organic materials.

The radiation detector 116 may include, for example, many individual detector elements arranged in a pattern (e.g., a row or an array) on one or more detection assemblies (also referred to as detection modules, detector modules, and/or the like), which are operatively connected to one another to form the radiation detector 116. In some embodiments, the detector elements may be configured to indirectly convert (e.g., using a scintillator array and photodetectors) detected radiation into analog signals. Further, as will be described in more detail below, the radiation detector 116, or detection assemblies thereof, may comprise electronic circuitry, such as, for example, an analog-to-digital (A/D) converter, configured to filter the analog signals, digitize the analog signals, and/or otherwise process the analog signals and/or digital signals generated thereby. Digital signals output from the electronic circuitry may be conveyed from the radiation detector 116 to digital processing components configured to store data associated with the digital signals and/or further process the digital signals.

In some embodiments, the digital signals may be transmitted to an image generator 118 configured to generate image space data, also referred to as images, from the digital signals using a suitable analytical, iterative, and/or other reconstruction technique (e.g., backprojection reconstruction, tomosynthesis reconstruction, iterative reconstruction, etc.). In this way, the data may be converted from projection space to image space, a domain that may be more understandable by a user 120 viewing the image(s), for example. Such image space data may depict a two dimensional representation of the object(s) 102 and/or a three dimensional representation of the object(s) 102. In other embodiments, the digital signals may be transmitted to other digital processing components, such as a threat analysis component 121, for processing.

The illustrated scanning system 100 may also include a terminal 122 (e.g., a workstation or other computing device), configured to receive the image(s), which can be displayed on a monitor 124 to the user 120 (e.g., security personnel, medical personnel, etc.). In this way, a user 120 can inspect the image(s) to identify areas of interest within the object(s) 102. The terminal 122 may also be configured to receive user input which may direct operations of the scanning system 100 (e.g., a rate at which the support 108 moves, activation of the radiation source(s) 114, etc.) and connected to additional terminals 122 through a network (e.g., a local area network or the Internet).

A control system 126 may be operably coupled to the terminal 122. The control system 126 may be configured to automatically control at least some operations of the scanning system 100. For example, the control system 126 may be configured to directly and/or indirectly, automatically, and dynamically control the rate at which the support 108 moves through the examination region 110, the rate at which the rotor 106 rotates relative to the stator 104, activation, deactivation, and output level of (e.g., intensity of radiation emitted by) the radiation source(s) 114, or any combination or subcombination of these and/or other operating parameters. In some embodiments, the control system 126 may also accept manual override instructions from the terminal 122 and to issue instructions to the scanning system 100 to alter the operating parameters of the scanning system based on the manual override instructions. The control system 126 may be located proximate to a remainder of the scanning system 100 (e.g., integrated into the same housing or within the same room as the remaining components) or may be distal from the scanning system 100 (e.g., located in another room, such as, for example, an on-site control room, an off-site server location, a cloud storage system). The control system 126 may be dedicated to control a single scanning system 100, or may control multiple scanning systems 100 in an operative grouping or subgrouping.

Figure 2:
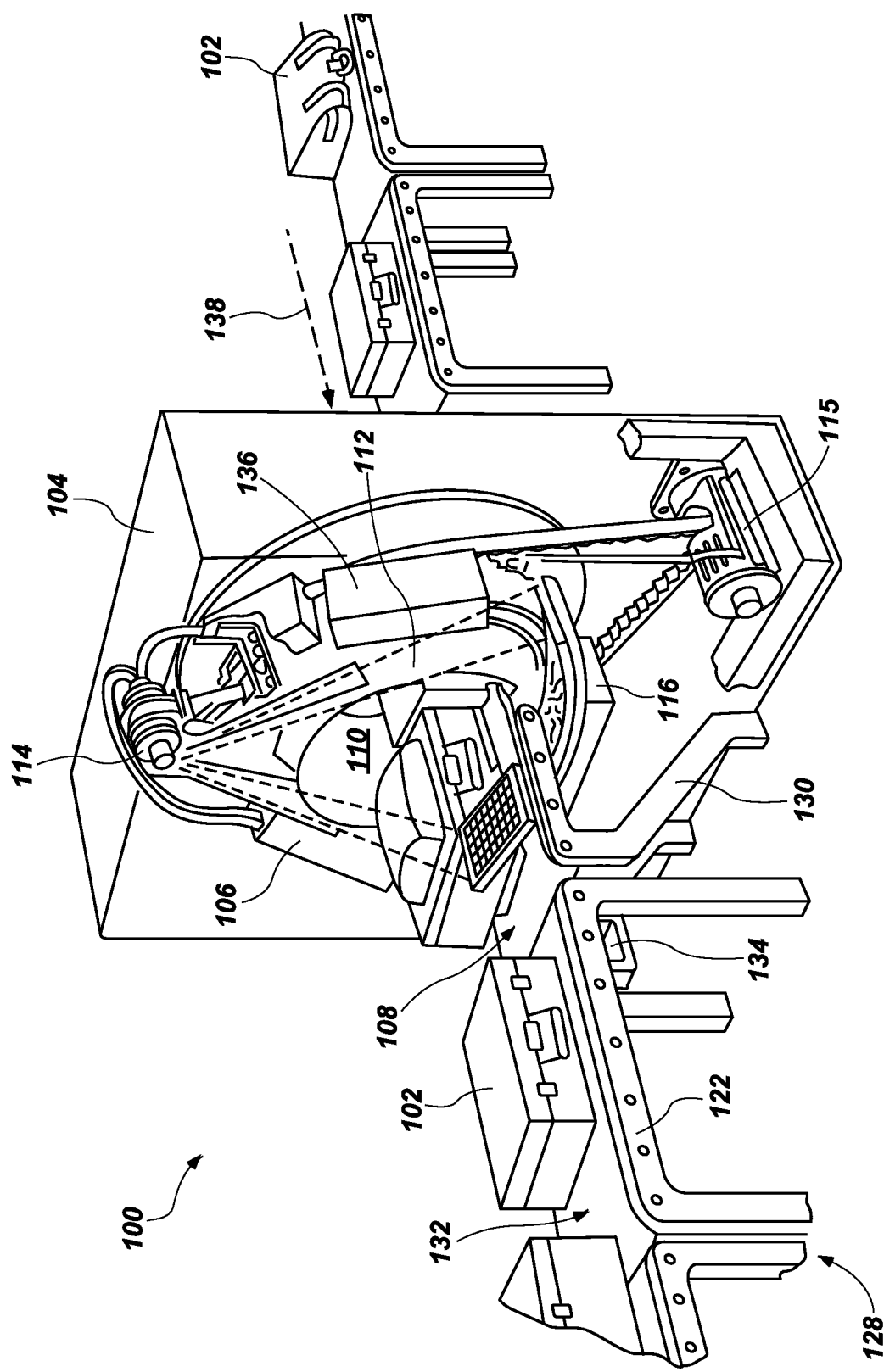
FIG. 2 is a perspective side view of a portion of the scanning system of FIG. 1.
Figure 3:
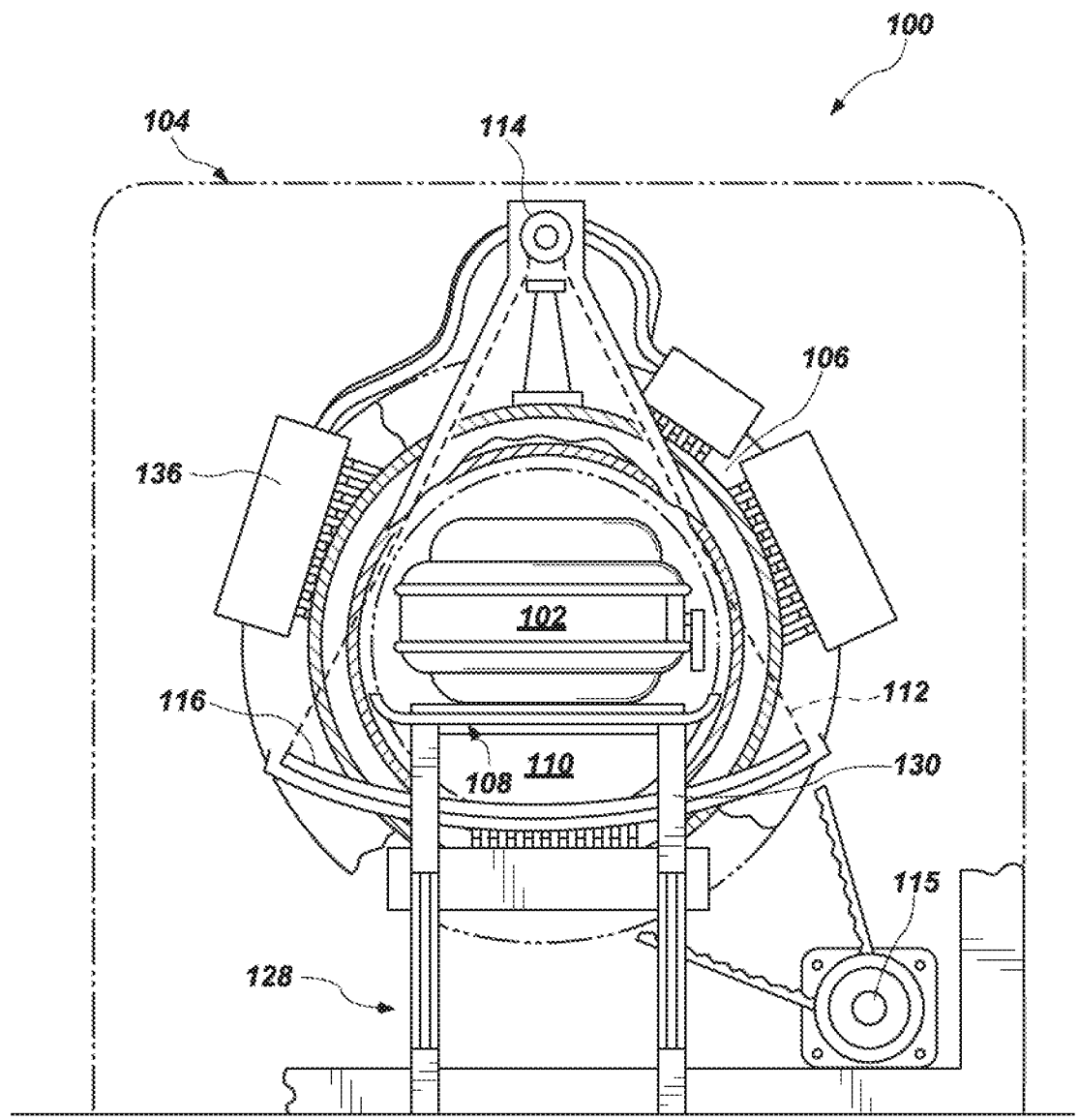
FIG. 3 is a front view of the portion of the scanning system of FIG. 2.

FIG. 2 is a perspective side view and FIG. 3 is a front view of a portion of the scanning system 100 of FIG. 1. Referring collectively to FIGS. 2 and 3, the scanning system 100 may be specifically configured as a baggage scanning system including an explosive detection system. The support 108 of the illustrated scanning system 100 may be configured as a conveyor system 128 configured to move objects 102 in the form of baggage, luggage, or other passenger items in a direction indicated by arrow 138 through the examination region 110 of the scanning system 100 so that helical scans can be performed on the objects 102. The conveyor system 128 may include, for example, belts 132 driven by motors 134 for supporting and transporting the objects 102. The speed of the motors 134 may control the linear rate at which the belts 132 transport the objects 102 supported thereon may proceed through the examination region 110. The control system 126 may issue command signals transmitted to the motors 134 (e.g., via a wireless or wired connection) to vary the speed of the motors 134 and associated belts 132. The conveyor system 128 may include, for example, several individual respective conveyors 130 (e.g., one conveyor 130 extending through the examination region 110, another conveyor 130 configured to convey objects 102 toward the scanning system 100, and another conveyor 130 configured to convey objects 102 away from the scanning system 100); however, other forms of conveyor systems may be used. The different conveyors 130 may be operated at different speeds in accordance with instructions issued by the control system 126.

The scanning system 100 may include a motivator 115 (e.g., motor, drive shaft, chain, etc.) configured to drive rotation of the rotor 106, and the radiation source(s) 114 and radiation detector(s) 116 supported thereon, relative to the stator 104. The motivator 115 specifically shown in FIGS. 2 and 3 is configured as a motor with a belt or chain supported on the stator 104 and mechanically engaged with the rotor 106 to cause the rotor 106 to rotate in response to movement of the motor and belt/chain. The speed of the motivator 115 may control the rotational rate at which the rotor 106 moves the radiation source(s) 114 and radiation detector(s) 116 supported thereby. The control system 126 may issue command signals transmitted to the motivator 115 (e.g., via a wireless or wired connection) to vary the speed of the motors 134 and associated belts 132. The scanning system 100 may also include shields 136 located circumferentially around the rotor 106, which may include a radiation-blocking material (e.g., lead) for reducing the likelihood that radiation 112 (see FIG. 1) emitted by the radiation source(s) 114 may propagate beyond the rotor 106 and/or stator 104.

Figure 4:
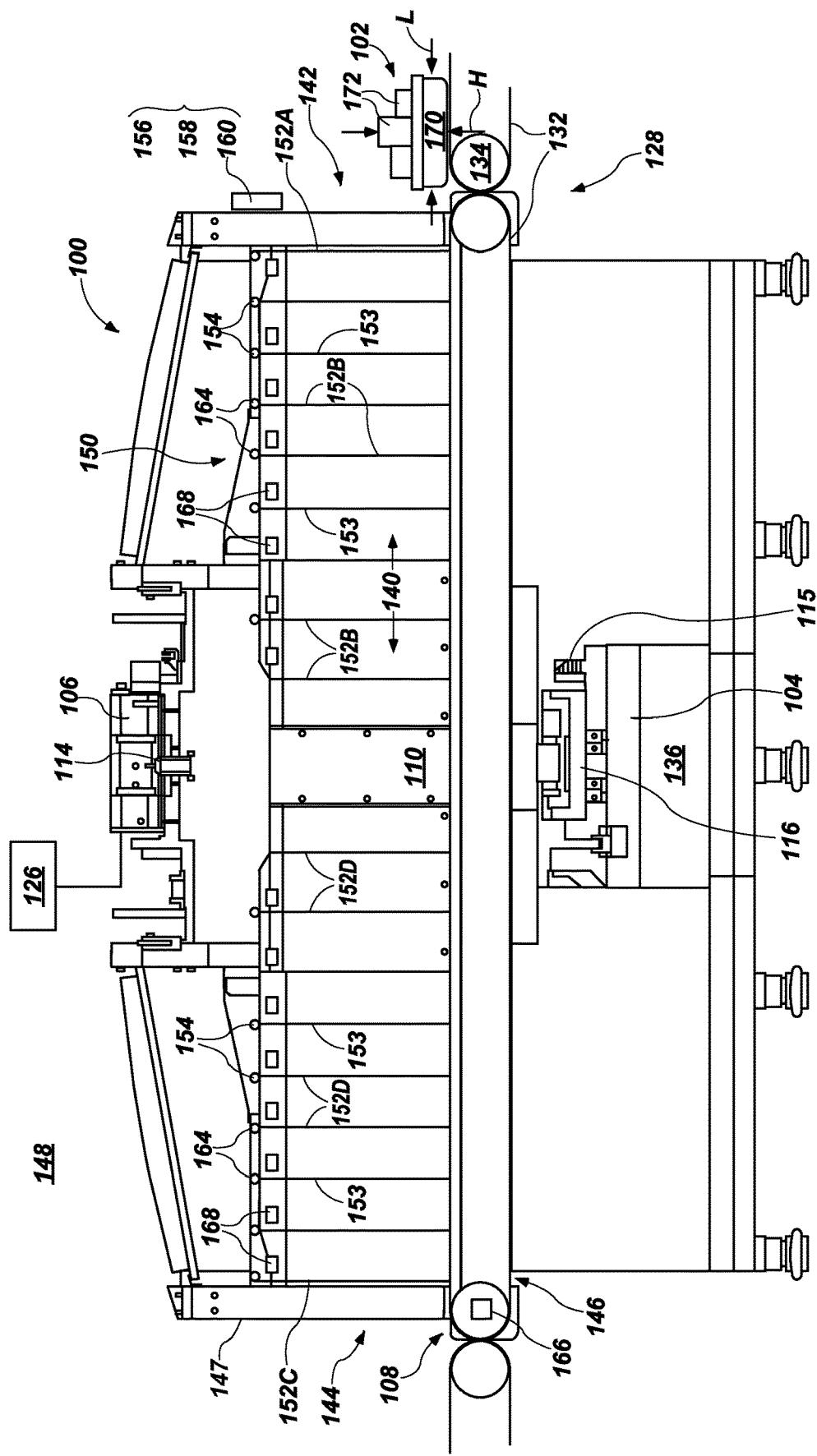
FIG. 4 is a cross-sectional side view of a portion of the scanning system of FIG. 1 with an object to be scanned located in a first position.

FIG. 4 is a cross-sectional side view of a portion of the scanning system 100 of FIG. 1 with an object 102 to be scanned located in a first position. The scanning system 100 may include a housing 147 within which the stator 104, the rotor 106, the at least one radiation source 114, and the at least one radiation detector 116 may be located. A pathway 140 may extend from an entrance 142 to the housing 147, through the rotor 106, to an exit 144 from the housing 147. The conveyor system 128 may include a respective conveyor 146 extending along the pathway 140 to convey objects 102 from an exterior 148, through the entrance 142, through the rotor 106 and past the radiation source(s) 114 and the radiation detector(s) 116, through the exit 144, back to the exterior 148 on another side of the scanning system 100.

To further reduce the likelihood that radiation 112 (see FIG. 1) emitted by the radiation source(s) 114 may propagate beyond the housing 147, the scanning system 100 may include a shielding system 150 comprising a series of independently movable energy shields 152 sized, shaped, and positioned to at least partially occlude the pathway 140. For example, the shielding system 150 may include a first energy shield 152A located proximate to the entrance 142, at least one second energy shield 152B located between the first energy shield 152 and the examination region 110, a third energy shield 152C located proximate to the exit 144, and at least one fourth energy shield 152D located between the third energy shield 152C and the examination region 110. More specifically, the shielding system 150 may include, for example, a first energy shield 152A at the entrance 142, between one and ten second energy shields 152B located between the first energy shield 152 and the examination region 110, a third energy shield 152C at the exit 144, and between one and ten fourth energy shields 152D located between the third energy shield 152C and the examination region 110. In some embodiments, the shielding system 150 may further include one or more shade curtains 153, which may be configured similar to the energy shields 152, but lack radiation-attenuating characteristics.

Each energy shield 152 and shade curtain 153 may be movable between a closed state in which the energy shield 152 laterally and vertically occludes the pathway 140 and an open state in which at least a portion of the pathway 140 is laterally and vertically free of the energy shield 152 and shade curtain 153 in some embodiments. For example, each energy shield 152 and shade curtain 153 may be movable laterally or vertically between the closed state and the open state, and may be temporarily fixable in positions between the closed state and the open state, at least when each energy shield 152 and shade curtain 153 is movable vertically. As specific, nonlimiting examples, each energy shield 152 and shade curtain 153 may be furlable and unfurlable about a respective rod 154 from which the associated energy shield 152 or shade curtain 153 is suspended and which rod 154 may rotate to cause the associated energy shield 152 to vertically raise the energy shield by rolling the energy shield 152 or shade curtain 153 around, and vertically lower the energy shield 152 or shade curtain 153 by unrolling the associated energy shield 152 or shade curtain 153 from, the rod 154 or each energy shield 152 and shade curtain 153 may be movable laterally along a track using a chain from which an associated energy shield 152 or shade curtain 153 is suspended and a gear that may rotate to cause the associated energy shield 152 or shade curtain 153 to laterally displace by interaction between the chain, gear, and associated energy shield 152 or shade curtain 153. In other embodiments, other mechanisms may be employed to move the energy shields 152 and/or shade curtains 153, such as, for example, pulley systems, rack and pinion systems, linkages, gravity-based systems, and other mechanical systems, and may be used to move the energy shields 152 and shade curtain 153 laterally or vertically. In other embodiments, one or more of the energy shields 152 and/or shade curtains 153 may not be movable.

Each energy shield 152 may include, for example, a panel or flap of flexible, radiation-attenuating material. More specifically, at least one and up to all of the energy shields 152 may include a grouping of flaps located laterally adjacent to one another across a width of the pathway 140 and mutually secured at a vertically upper portion of the pathway 140. As specific, nonlimiting examples, each energy shield 152 may include a flap or fringed flap of lead-lined or lead-impregnated, flexible material. The shade curtains 153 may include panels or flaps of flexible material that does not necessarily attenuate radiation.

Objects transported through scanning system having conventional energy shields may contact the energy shields, relying on the force supplied by the conveyor system to push the objects past the hanging energy shields, after which the energy shields fall down or swing sideways to their lowest positions. The materials, sizes, and shapes of these hanging energy shields may render them heavy, and the inventors of the subject matter disclosed herein have found that contact between objects and conventional energy shields may cause lighter objects to be displaced by the energy shield. For example, in embodiments where objects are supported in trays, the objects may fall out of trays in which they were previously located, fail to pass the energy shields, or both. Jostling objects and placing them out of order from their order of insertion may, at a minimum, cause delays as users retrieve their items or, at greater risk, may jam or damage the conveyor system or other components of the scanning system.

To mitigate these and other concerns, energy shields 152 and shade curtains 153 in accordance with this disclosure may dynamically displace under control of the control system 126 in response advancement of objects 102 toward, through, and away from the scanning system 100. Such dynamic displacement of the energy shields 152 and shade curtains 153 may reduce (e.g., minimize) the contact with the objects 102 being scanned and therefore reduce the risk of jamming or unintentionally dislodging objects 102 from their original placement relative to one another at the entrance 142 of the scanning system 100. For example, the scanning system 100 may include a presence sensor 156, a height sensor 158, a length sensor 160, or any combination of these operatively connected to the control system 126. More specifically, the scanning system 100 may include an infrared, ultrasonic, or other type sensor 162 located proximate to the entrance 142, the sensor 162 positioned, oriented, and configured to scan the respective conveyor 146 and any objects 102 supported thereon, and send the scanned information to the control system 126. The control system 126 may determine whether an object 102 is present on the respective conveyor 146 proximate to the entrance 142, and optionally one or both of the height H of each individual object 102 above the respective conveyor 146 and the length L of each individual object 102 as measured in a direction parallel to the direction of movement of the object 102 along the pathway 140. More specifically, the control system 126 may receive one or more electronic signals from the sensor 162 indicative of whether an object 102 is approaching the entrance 142, the maximum height H or an entire height H of a given object 102, and the length L of the object 102.

As an object 102 approaches the entrance 142, the control system 126 may begin controlling the shielding system 150 by synchronizing movement of the energy shields 152 and shade curtains 153 in general, and the first energy shield 152A or shade curtain in particular, with the approach of the object 102 to reduce (e.g., eliminate) contact between the energy shields 152 and shade curtains 153 and the object 102 as the object 102 is moved through the scanning system 100 by the respective conveyor 146. For example, the control system 126 may send a control signal to a first motivator 164A (e.g., a solenoid) to initiate movement of the first energy shield 152A or shade curtain sufficiently in advance of the arrival of the object 102 at the first energy shield 152A or shade curtain that the object 102 may not contact the first energy shield 152A or shade curtain when passing thereby. More specifically, the control system 126 may base its timing for sending the control signal on the rate of advance of the object 102 on the respective conveyor 146 (e.g., as measured by the sensor 162 or sent by another sensor 166 associated with the conveyor system 128), the rate at which the first energy shield 152A or shade curtain is capable of moving, the distance D between the object 102 and the first energy shield 152A or shade curtain, and the height H of the object 102. Synchronizing movement of the energy shields 152 and shade curtains 153 to the approach and other movement of the object 102 may reduce the time and extent that the energy shields 152 and shade curtains 153

The control system 126 may move the first energy shield 152A or shade curtain at least in time that the object 102 may make only nominal or no contact with the first energy shield 152A or shade curtain. For example, the first energy shield 152A or shade curtain may be raised to a height above the respective conveyor 146 equal to or higher than the height H of the object 102 at its leading end in embodiments where the first energy shield 152A or shade curtain is movable vertically. The first energy shield 152A or shade curtain may then continue to raise and/or lower dynamically as the object 102 proceeds past the first energy shield 152A or shade curtain. For example, the first energy shield 152A or shade curtain may raise and lower along the length L of the object 102 to keep the lowest portion of the first energy shield 152A or shade curtain proximate to the dynamically changing height H of the object, may raise directly to or above the maximum height H of the object 102 and remain there while the object 102 passes, or may raise directly to a maximum height of the first energy shield 152A or shade curtain above the respective conveyor 146 and remain in that position while the object 102 passes. In embodiments where the first energy shield 152A or shade curtain moves laterally, the first energy shield 152A or shade curtain may be displaced to completely unobstruct the pathway 140 by the time the object 102 reaches the first energy shield 152A or shade curtain.

Figure 5:
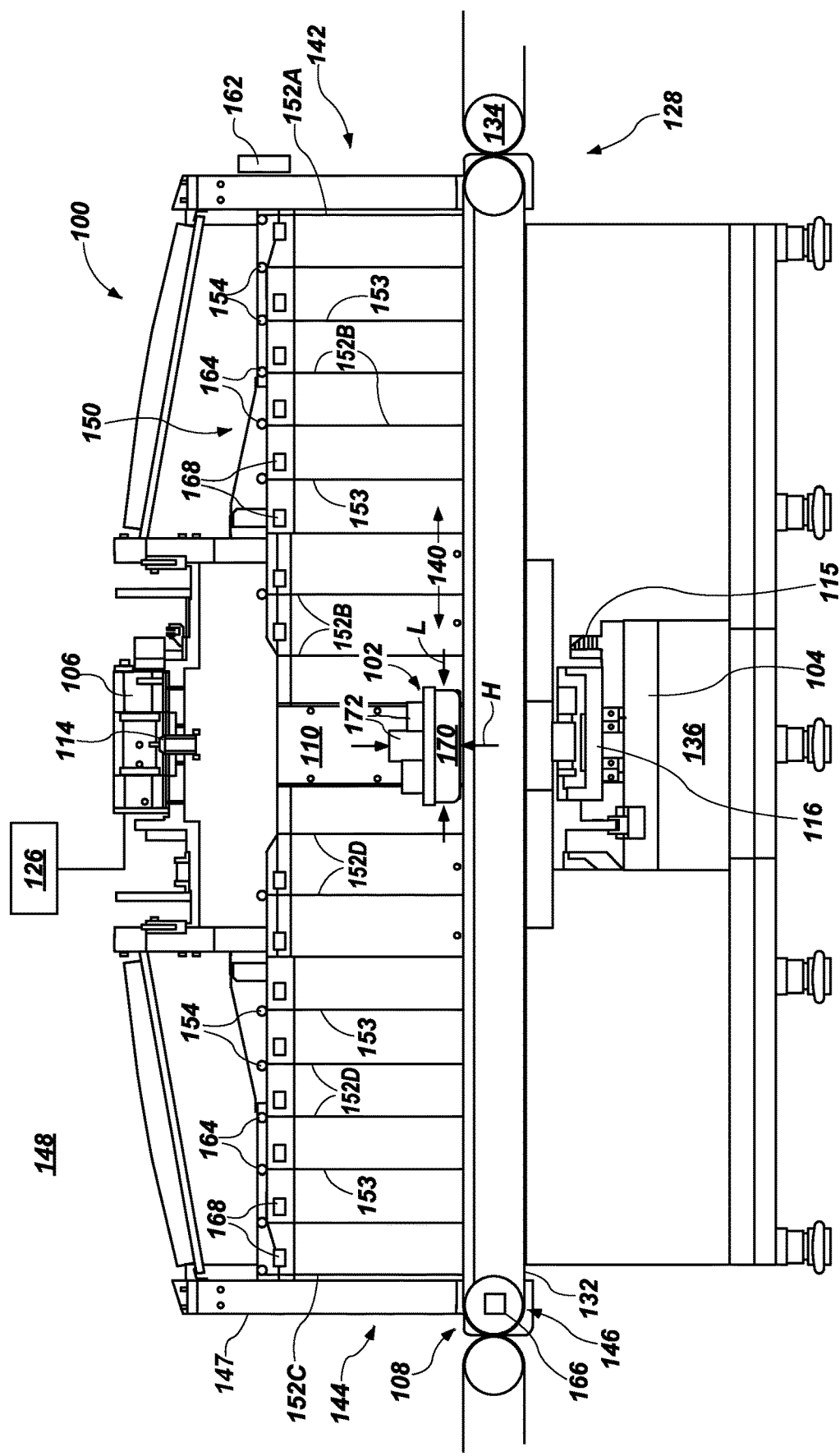
FIG. 5 is a cross-sectional side view of the portion of the scanning system of FIG. 4 with the object in a second position.

FIG. 5 is a cross-sectional side view of the portion of the scanning system 100 of FIG. 4 with the object 102 in a second position. As the object 102 is moved by the respective conveyor 146 through the pathway 140, the control system 126 may continually send control signals to the shielding system 150 to cause respective energy shields 152 and shade curtains 153 to move, unobstructing at least a portion of the pathway 140, as the object 102 approaches and passes the energy shields 152 and shade curtains 153 and then move again, re-obstructing the pathway 140 once the object 102 has passed the respective energy shields 152 and shade curtains 153. For example, the control system 126 may cause the second energy shields 152B to move in sequence following movement of the first energy shield 152A, the fourth energy shields 152D to move in sequence following movement of the second energy shields 152B, the shade curtains 153 to move in sequence following movement of the immediately preceding energy shields 152 and/or shade curtains 153, and the third energy shield 152C to move following movement of the fourth energy shields 152D as the control system 126 tracks progress of the object 102 along the respective conveyor 146 through the pathway 140. More specifically, the control system 126 may track the movement of the object 102 by inferring the actual position of the object from the initial position of the object 102 detected by the sensor 162 proximate to the entrance 142 and ongoing monitoring of the speed of the respective conveyor 146, or utilizing additional sensors 168 operatively connected to the control system 126 and interposed between adjacent energy shields 152 and shade curtains 153 to continue detecting the presence, height, and/or length of the object 102 as it passes through the scanning system 100. The additional sensors 168 may be in accordance with any of the options for the first sensor 162 described previously.

The control system 126 may cause the energy shields 152 and shade curtains 153 to synchronize their movement to the movement of the object 102 through the pathway 140, such that a motivator 164 associated with a given energy shield 152 or given shade curtain 153 initiates movement of the energy shield 152 or shade curtain 153 before arrival of the object 102 at the relevant energy shield 152 or relevant shade curtain 153, maintains the relevant energy shield 152 or relevant shade curtain 153 at least partially out of the pathway 140 to reduce (e.g., eliminate) contact between the relevant energy shield 152 or the relevant shade curtain 153 and the object 102 as it passes the relevant energy shield 152 or the relevant shade curtain 153, and at least attempts to return the relevant energy shield 152 or the relevant shade curtain 153 to a closed state after passage of the object 102. Movement of each energy shield 152 and shade curtain 153 may be at least substantially as described previously in connection with movement of the first energy shield 152A or shade curtain. In some embodiments, the positions of portions of the energy shields 152 and shade curtains 153 distal from the motivators 164 may resemble a trapezoidal wave (e.g., as the location of the distal ends of the energy shields 152 and shade curtains 153 is projected onto a vertical plane extending parallel to movement of the object 102 in embodiments where the energy shields 152 and shade curtains 153 move vertically or as projected onto a horizontal plane in embodiments where the energy shields 152 and shade curtains 153 move laterally) as the energy shields 152 and shade curtains 153 transition from the closed state to the at least partially open state, are maintained at least partially open, and transition back to the closed state in response to advancement of the object 102 through the pathway 140.

The control system 126 may also synchronize activation of the radiation source(s) 114 to the movement of objects 102 through the pathway 140. For example, when the presence sensor 156 detects that no objects 102 are within or approaching the pathway 140, the control system 126 may issue a control signal to the radiation source(s) 114 to reduce the intensity of the radiation emitted by the radiation source(s) 114 or to cause the radiation source(s) 114 to temporarily stop emitting radiation. Once the presence sensor 156 detects that an object 102 is approaching the entrance 142, the control system 126 may issue a control signal to the radiation source(s) 114 to increase the intensity of radiation emitted by the radiation source(s) 114, which may involve causing the radiation source(s) 114 to begin or reinitiate emitting radiation in embodiments where the radiation source(s) 114 were not emitting radiation. The control system 126 may time issuance of the control signal, or may send instructions with the control signal, such that the radiation sources(s) 114 may reach a target intensity of radiation emitted by the time (e.g., at the same time) as the object(s) 102 reach the examination region 110.

In some embodiments, returning the energy shields 152 and shade curtains 153 to their closed state may likewise be synchronized with movement of the object 102. For example, the energy shields 152 and shade curtains 153 may lower from proximate to the dynamically changing height H of the object 102 immediately after the object 102 passes the relevant energy shield 152 or shade curtain 153, may lower from at or above the maximum height H of the object 102 (e.g., from the maximum height of the energy shield 152 above the respective conveyor 146) when a distance to the trailing end of the object 102, a rate at which the object 102 is advancing, and a rate at which the relevant energy shield 152 or relevant shade curtain 153 lowers is such that the object 102 will clear the relevant energy shield 152 or relevant shade curtain 153 by the time the relevant energy shield 152 or relevant shade curtain 153 lowers to the height H of the object at its trailing end, or may simply begin lowering once the object 102 has passed the relevant energy shield 152 or relevant shade curtain 153 in embodiments where the energy shields 152 and shade curtains 153 move vertically. In embodiments where the energy shields 152 and shade curtains 153 move laterally, a given energy shield 152 or given shade curtain 153 may be displaced to completely obstruct the pathway 140 beginning, for example, when the object 102 passes the relevant energy shield 152 or relevant shade curtain 153.

Figure 6:
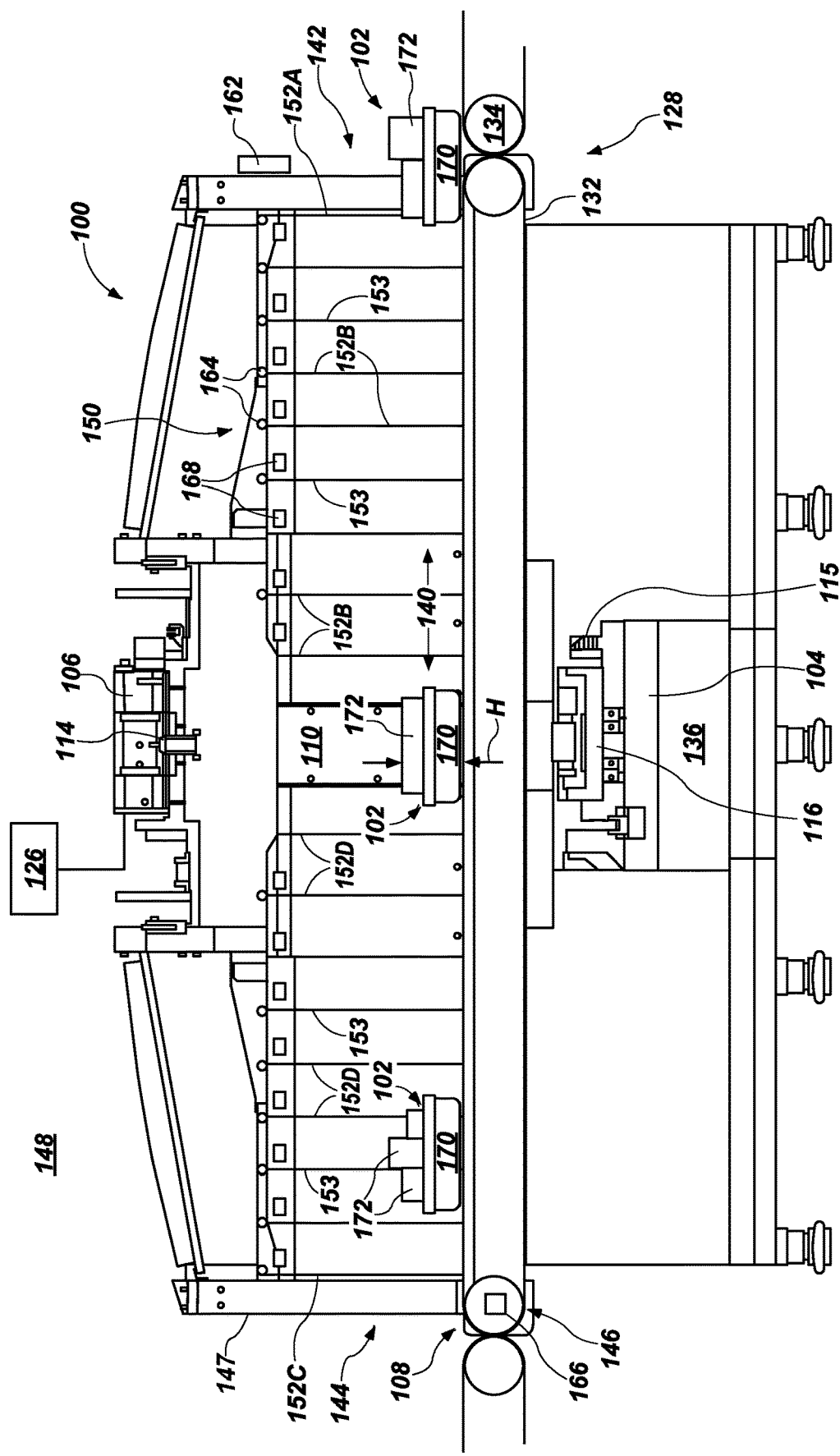
FIG. 6 is a cross-sectional side view of the portion of the scanning system of FIG. 5 with objects in various positions along the scanning system.

FIG. 6 is a cross-sectional side view of the portion of the scanning system 100 of FIG. 5 with objects 102 in various positions along the scanning system 100. When processing multiple objects 102 in succession, the control system 126 may be configured to manage movement of the objects 102 through the scanning system 100 utilizing the conveyor system 128 as well as the extent to which each energy shield 152 and shade curtain 153 in the shielding system 150 is in an open state, partially open state, closed state, or transitioning therebetween to facilitate efficient movement of the objects 102 through the scanning system 100 as well as producing quality scans of the objects 102 and mitigating the risk that radiation from the radiation source(s) 114 is emitted from the pathway 140. For example, the control system 126 may maintain at least one energy shield 152 in a closed state on each side of the examination region 110 at least when scanning an object 102. More specifically, the control system 126 may be configured to cause the motivators 164 to ensure that at least one energy shield 152 or shade curtain 153 is in its closed state between each adjacent object 102 passing through the scanning system 100. As a specific, nonlimiting example, the control system 126 may be configured to cause each motivator 164 to move each energy shield 152 and each shade curtain 153 to its closed state each time an object 102 passes the relevant energy shield 152 or relevant shade curtain 153 before initiating movement of the relevant energy shield 152 or relevant shade curtain 153 to enable less-obstructed passage of a subsequent object 102 past the relevant energy shield 152 in the pathway 140.

In some embodiments, objects 102 may only be accepted for input via the entrance 142 of the scanning system 100 when the objects 102 include a tray 170 within which other items 172 may be positioned. For example, operators or the control system 126 of the scanning system 100 may require users to place any items 172 to be scanned within trays 170 sized, shaped, and designated for passage through the pathway 140. More specifically, operators of the scanning system 100 may require users to place items 172 to be scanned within the trays 170, and the operators may ensure that there is at least a minimum spacing 174 between adjacent trays 170 on the conveyor system 128 or the control system 126 may control movement of the conveyor system 128 to automatically provide for a predetermined minimum spacing 174 between adjacent trays 170. As specific, nonlimiting examples, operators or the control system 126 of the scanning system 100 may require users to place items 172 to be scanned within the trays 170, and the operators or control system 126 may ensure that there is a minimum spacing 174 of between about 10 cm and about 30 cm (e.g., about 15 cm) between adjacent trays 170 on the conveyor system 128.

Figure 7:
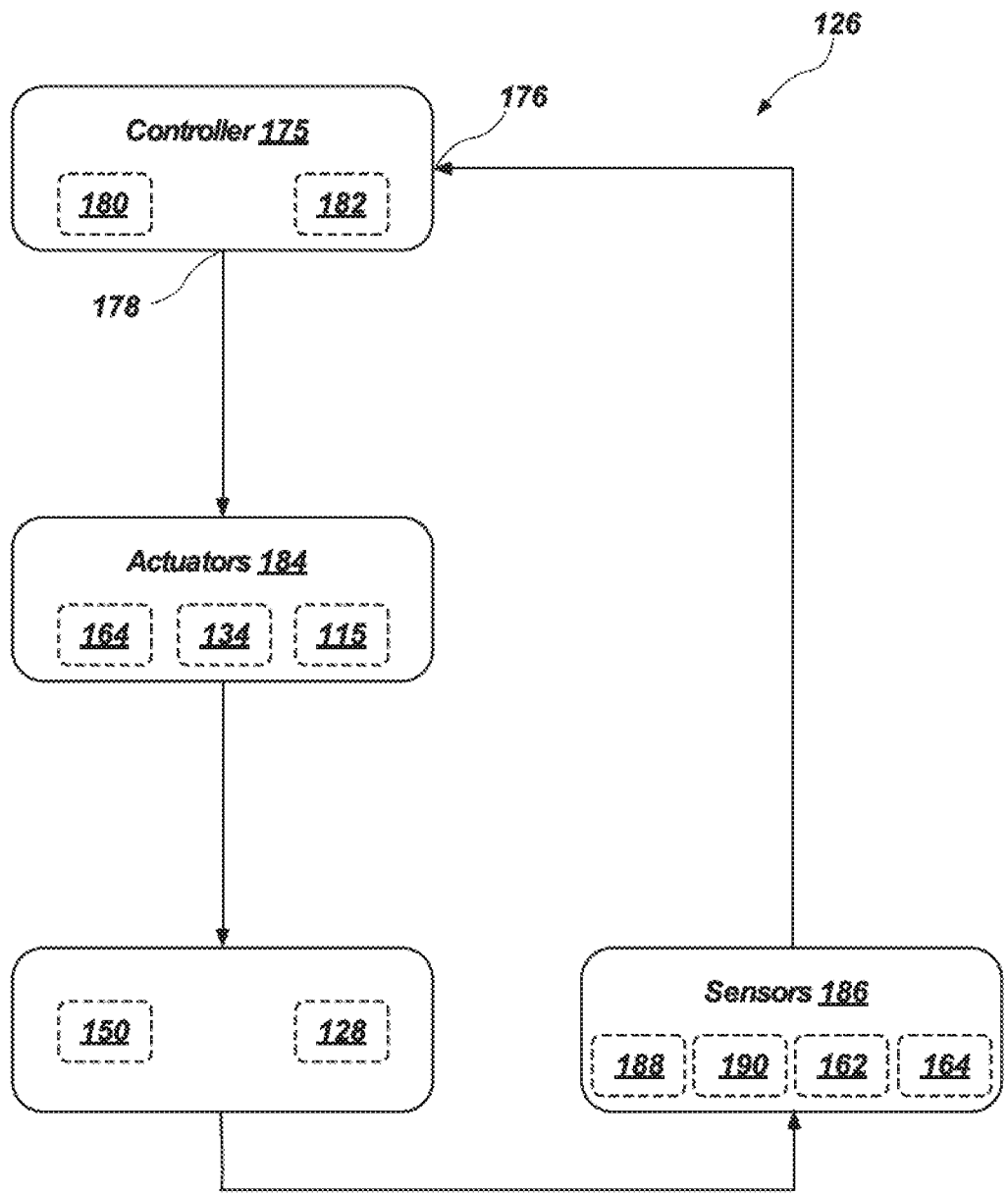
FIG. 7 is a schematic of a control system configured to control components of the scanning system of FIG. 1.

FIG. 7 is a schematic of a control system 126 configured to control components of the scanning system 100 of FIG. 1. For example, the control system 126 may include a controller 175 configured to receive feedback signals from components of the scanning system 100, issue control signals to components of the scanning system 100, and execute control software stored by, or accessible to, the control system 126. More specifically, the controller 175 may be configured as a computing device, including one or more input ports 176 configured to accept feedback signals from components of the scanning system 100 via a wired and/or wireless connection, one or more output ports 178 configured to issue control signals from the controller 175 to components of the scanning system 100 via a wired and/or wireless connection, one or more processing units 180 configured to execute software instructions to process the feedback signals and generate the control signals, and one or more memory devices 182 configured to store the software instructions and at least temporarily store the control signals and the feedback signals. The processing unit(s) 180 may be configured as, for example, a processor (e.g., a special-purpose processor), a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. The memory devices 182 may be configured as, for example, physical, tangible devices having physical interfaces for interconnection with other components of the controller 175 (e.g., a bus), and should be considered to exclude transitory signals. More specifically, memory devices 182 may include, for example, flash memory, random-access-memory (RAM), read-only memory (ROM) a diskette, a magnetic tape, a digital tape, a compact disc, an integrated circuit, a CD, DVD, Blu-Ray, a cartridge, flash memory, PROM, a memory stick or card, or any other non-destructive storage medium useable by computers, including those that are re-writable. The memory devices 182 may store, for example, software instructions in the form of a computer program product configured to perform functions in accordance with this disclosure.

The controller 175 may be operatively connected to various actuators 184 of the scanning system 100, such as, for example, the motivators 164 that move the energy shields 152 and/or shade curtains 153, the motors 134 that move the respective conveyors 146, the motivator 115 that moves the rotor 106 and the components supported thereon, the radiation source(s) 114, or any combination or subcombination of these components. When the control signals are received at the actuators 184, the actuators 184 may activate, moving or otherwise activating the components associated with the actuators, such as, for example, the energy shields 152, the shade curtains 153, the respective conveyors 146, the rotor 106, and/or the radiation source(s) 114. The actuators 184 may produce a dynamic response in the associated shielding system 150, conveyor system 128, and/or other component of the scanning system 100. Sensors 186, such as, for example, position sensors 188 and/or speed sensors 190 may detect the dynamic response of the shielding system 150, conveyor system 128, and/or other components of the scanning system 100. More specifically, position sensors 188 may detect the locations of the energy shields 152 and/or shade curtains 153 of the shielding system 150, and position sensors 168 (see FIGS. 4-6) and/or speed sensors 190 may track the progress of objects 102 along the conveyor system 128. Status from the sensors 186 may be relayed back to the controller 175, which may analyze the status of the scanning system 100 and issue updated control signals to the actuators 184 to effect real-time adjustments to the operation of the actuators 184 and dynamic response of the associated shielding system 150, conveyor system 128, and/or other components of the scanning system 100.

Figure 8:
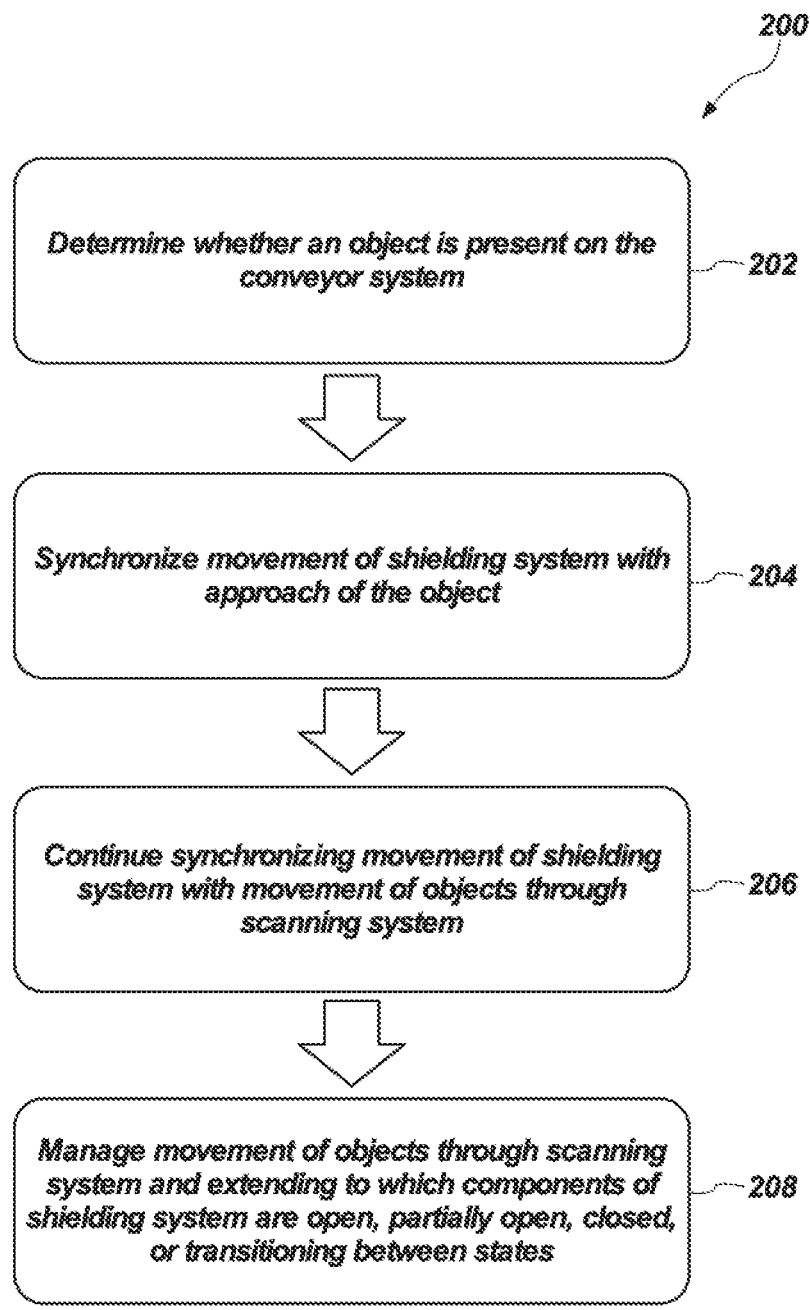
FIG. 8 is a flow chart of a method of operating a scanning system.

FIG. 8 is a flow chart of a method 200 of operating a scanning system 100 (see FIGS. 4-6). The method 200 may involve, for example, determining may determine whether an object 102 is present on a respective conveyor 146 of a conveyor system 128 proximate to the entrance 142 to a housing 147 of the scanning system 100 utilizing a sensor 162 operatively connected to a control system 126, as shown at act 202. The sensor 162 may optionally determine one or both of the height H of each individual object 102 above the respective conveyor 146 and the length L of each individual object 102 as measured in a direction parallel to the direction of movement of the object 102 along the pathway 140. In some embodiments, the control system 126 may construct a height profile of a given object 102 or of each object 102, which may depict essentially an entirety of the height H of the object 102 as it changes along the length L of the object 102 from end to end. In other embodiments, the height profile that the control system 126 constructs of the object 102 may be simplified, such as, for example, representing only the maximum height H or the height H at discrete points along the length L of the object 102. In some embodiments, the control system 126 may update its height profile of an object 102 as the object 102 proceeds through the pathway 140 in response to additional sensor data regarding the shape of the object 102 (and any changes thereto). Changes in the height H or length L of the object 102 may indicate that an item 172 has fallen out of the tray 170 or otherwise become dissociated from the rest of the object 102, which may prompt an operator to investigate the pathway 140 for loose items 172.

As an object 102 approaches the entrance 142, the control system 126 may begin controlling the shielding system 150 by synchronizing movement of the energy shields 152 and shade curtains 153 with the approach of the object 102 to reduce (e.g., eliminate) contact between the energy shields 152 and shade curtains 153 and the object 102 as the object 102 is moved through the scanning system 100 by the respective conveyor 146, as shown at act 204. For example, the control system 126 may send control signals to motivators 164 to initiate movement of the energy shields 152 and shade curtains 153 in sequence such that the energy shields 152 and shade curtains 153 may not contact the object 102 passing thereby.

The control system 126 may continue to synchronize the movement of the energy shields 152 and shade curtains 153 to the movement of the object 102 through the pathway 140, such that the control system 126 maintains the relevant energy shield 152 or relevant shade curtain 153 at least partially out of the pathway 140 to reduce (e.g., eliminate) contact between the relevant energy shield 152 or the relevant shade curtain 153 and the object 102 as it passes the relevant energy shield 152 or the relevant shade curtain 153, and at least attempts to return the relevant energy shield 152 or the relevant shade curtain 153 to a closed state after passage of the object 102, as shown at act 206.

The control system 126 may be manage movement of the objects 102 through the scanning system 100 utilizing the conveyor system 128 as well as the extent to which each energy shield 152 and shade curtain 153 in the shielding system 150 is in an open state, partially open state, closed state, or transitioning therebetween to facilitate efficient movement of the objects 102 through the scanning system 100 as well as producing quality scans of the objects 102 and mitigating the risk that radiation from the radiation source(s) 114 is emitted from the pathway 140, as shown at act 208. For example, the control system 126 may maintain at least one energy shield 152 in a closed state on each side of the examination region 110 at least when scanning an object 102.

Moving the energy shields hanging within a pathway through a scanning system to reduce (e.g., eliminate) contact between the energy shields and objects passing through the scanning system may improve the process of scanning the objects, producing an enhanced scanning system. For example, movement of energy shields in accordance with this disclosure may reduce risk of radiation exposure, reduce risk of jamming the scanning system or otherwise slowing down the process of scanning items, and reduce risk of losing items during the scanning process.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure, as contemplated by the inventors.

What is claimed is:

1. A scanning system configured to perform radiation-based scanning, comprising:
    a stator, a rotor supporting at least one radiation source and at least one radiation detector rotatable with the rotor, and a motivator operatively connected to the rotor to rotate the rotor relative to the stator;
    a housing within which the stator, the rotor, the at least one radiation source, and the at least one radiation detector are located;
    a conveyor system extending through the housing and the rotor;
    a shielding system comprising a series of independently movable energy shields sized, shaped, and positioned to at least partially occlude a pathway along which the conveyor system extends, the pathway extending from an entrance to the housing, through the rotor, to an exit from the housing; and
    a control system operatively connected to the stator, the rotor, the radiation source, the conveyor system, and the shielding system, the control system configured to synchronize movement of a respective energy shield when a distance of an object from the respective energy shield, a rate at which the object is advancing toward the respective energy shield, a rate at which the respective energy shield moves, and a height of the object are such that a lowest portion of the respective energy shield will be at or above the height of the object by a time the object reaches the respective energy shield.

2. The scanning system of claim 1, wherein the control system is configured to cause the energy shields not to contact objects as they pass under the energy shields.

3. The scanning system of claim 1, further comprising a presence sensor, a height sensor, a length sensor, or any combination of the presence sensor, the height sensor, and the length sensor positioned between each energy shield along the pathway.

4. The scanning system of claim 1, further comprising a height sensor operatively connected to the control system, the height sensor positioned, oriented, and configured to detect a height of each object supported on the conveyor system relative to an uppermost surface of the conveyor system as each object approaches the shielding system.

5. The scanning system of claim 4, wherein the control system is configured to cause respective energy shields to raise only to a height less than a maximum height of the respective energy shields above the conveyor system and proximate to the height of an object passing the respective energy shields.

6. The scanning system of claim 1, further comprising a length sensor operatively connected to the control system, the length sensor positioned, oriented, and configured to detect a length of each object supported on the conveyor system as measured in a direction parallel to movement of each object on the conveyor system as each object approaches the shielding system.

7. The scanning system of claim 1, wherein each energy shield is independently movable at least in a vertical direction.

8. The scanning system of claim 1, wherein each energy shield is furlable about a respective rod.

9. The scanning system of claim 8, wherein the shielding system comprises a motor for each respective rod and connected to the control system, the control system configured to automatically and dynamically unfurl and furl each energy shield about the respective rod by causing each respective motor to rotate the respective rod to unfurl and furl the energy shield.

10. The scanning system of claim 1, wherein the control system is configured to cause energy shields proximate to the entrance to move before energy shields distal from the entrance move in response to advancement of an object along the conveyor system toward the entrance.

11. The scanning system of claim 1, wherein the control system is configured to cause energy shields proximate to the entrance to return to a closed state before energy shields distal from the entrance return to the closed state in response to advancement of an object along the conveyor system toward the at least one radiation source and the at least one radiation detector.

12. The scanning system of claim 1, wherein the control system is configured to cause at least one energy shield between the entrance and the at least one radiation source and at least one energy shield between and the at least one radiation source to be in a closed state when the at least one radiation source is active.

13. The scanning system of claim 1, wherein the control system is configured to synchronize the movement of the respective energy shield when a distance of a trailing end of an object from the respective energy shield, a rate at which the object is advancing past the respective energy shield, a rate at which the respective energy shield lowers, and a height of the object are such that a lowest portion of the respective energy shield will be below the height of the object after the time the object clears the respective energy shield.

14. The scanning system of claim 1, wherein the control system is configured to synchronize movement of a respective energy shield to a closed state of the respective energy shield after each respective object passes the respective energy shield and before each next respective object reaches the respective energy shield.

15. The scanning system of claim 1, wherein at least one energy shield comprises a grouping of flaps located laterally adjacent to one another across a width of the pathway and mutually secured at a vertically upper portion of the pathway.

16. A method of operating a scanning system configured to perform radiation-based scanning, comprising:
    advancing an object supported on a conveyor system under control of a control system toward an entrance to a pathway extending through a housing, the housing enclosing a stator and a rotor supporting at least one radiation source and at least one radiation detector rotatable with the rotor, the pathway passing between the at least one radiation source and the at least one radiation detector;

automatically moving at least one energy shield at least partially occluding the entrance to an at least partially open state under control of the control system in response to advancement of the object toward the entrance by synchronizing moving the at least one energy shield to the at least partially open state when a distance of the object from the at least one energy shield, a rate at which the object is advancing toward the at least one energy shield, a rate at which the at least one energy shield moves, and a height of the object are such that a lowest portion of the respective energy shield is at or above the height of the object by the time the object reaches the at least one energy shield; and automatically moving the at least one energy shield to a closed state under control of the control system in response to the object passing the at least one energy shield.

17. The method of claim 16, further comprising:
accepting each object supported on the conveyor system in a respective tray; and
automatically moving each energy shield located between trays in the pathway to a closed state proximate to the conveyor system.

18. The method of claim 16, further comprising:
automatically moving each energy shield to the at least partially open state in sequence along the pathway from the entrance to an exit under control of the control system in response to advancement of the object through the housing; and
automatically moving each energy shield to the closed state in sequence along the pathway from the entrance to the exit under control of the control system in response to the object passing each respective energy shield.

19. The method of claim 16, further comprising synchronizing moving the at least one energy shield from the at least partially open state toward the closed state when a distance of a trailing end of the object from the at least one energy shield, a rate at which the object is advancing past the at least one energy shield, a rate at which the at least one energy shield moves, and a height of the object are such that a lowest portion of the respective energy shield is below the height of the object by the time the object clears the at least one energy shield.

20. The method of claim 16, further comprising synchronizing moving each respective energy shield to the closed state after each respective object passes each respective energy shield and before each next respective object reaches each respective energy shield.

21. Nontransitory, computer-readable media including computer-executable instructions, which when executed cause a control system for a scanning system to:
receive a feedback signal from a sensor that an object supported on and advanced by a conveyor system is located proximate to an entrance to a pathway extending through a housing, the housing enclosing a stator and a rotor supporting at least one radiation source and at least one radiation detector rotatable with the rotor, the pathway passing between the at least one radiation source and the at least one radiation detector;
issue a control signal to at least one actuator, causing the at least one actuator to automatically move at least one energy shield at least partially occluding the entrance to an at least partially open state under control of the control system in response to advancement of the object toward the entrance by synchronizing moving the at least one energy shield to the at least partially open state when a distance of the object from the at least one energy shield, a rate at which the object is advancing toward the at least one energy shield, a rate at which the at least one energy shield moves, and a height of the object are such that a lowest portion of the respective energy shield is at or above the height of the object by the time the object reaches the at least one energy shield; and
issue a control signal to at least one motor of the conveyor system, causing the conveyor system to automatically move the at least one energy shield to a closed state under control of the control system in response to the object passing the at least one energy shield.

\* \* \* \* \*

UNITED STATES PATENT AND TRADEMARK OFFICE
CERTIFICATE OF CORRECTION

PATENT NO. : 11,029,441 B2
APPLICATION NO. : 16/422709
DATED : June 8, 2021
INVENTOR(S) : Steven Weed and Patrick Splinter Page 1 of 1

It is certified that error appears in the above-identified patent and that said Letters Patent is hereby corrected as shown below:

In the Claims
    Claim 12,    Column 14,    Line 36,    change "between and" to --between the exit at--

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*